United States Patent Office 3,766,258
Patented Oct. 16, 1973

3,766,258
PROCESS FOR THE PRODUCTION OF AROMATIC POLYCARBOXYLIC ACIDS
Robert M. Engelbrecht, deceased, late of St. Louis, Mo., by Alice M. Engelbrecht, executrix, St. Louis, and James C. Hill, Chesterfield, Mo., assignors to Monsanto Company, St. Louis, Mo.
No Drawing. Filed June 29, 1970, Ser. No. 50,983
Int. Cl. C07c 63/00, 63/26
U.S. Cl. 260—515 P
12 Claims

ABSTRACT OF THE DISCLOSURE

A process for the carboxylation of aromatic carboxylic acids comprises preparing an alkali metal aromatic carboxylate from an aromatic carboxylic acid having the same ring structure as the aromatic carboxy acid to be produced, heating in an inert atmosphere under substantially anhydrous conditions said carboxylate to a temperature of from about 300° centigrade to a temperature below that temperature at which said carboxylate and the desired reaction products substantially decompose and in the presence of an acid binding agent and a basic metal carbonate catalyst selected from group which consists of basic cupric carbonate and basic chromium carbonate and acidifying the resultant salts whereby the aromatic carboxylic acid produced contains at least one more carboxyl group that the aromatic carboxylic acid to be carboxylated. Aromatic carboxylic acids produced by this process are useful as raw materials for the production of polyesters for fibers, films and plasticizers.

This invention relates to a process for the production of aromatic or aromatic heterocyclic polycarboxylic acids from aromatic or aromatic heterocyclic monocarboxylic acids.

It is known that alkali metal salts of carboxylic acids, the carboxyl groups of which are attached to aromatic ring systems, can be transformed into salts of other aromatic carboxylic acids with at least two carboxyl groups in the molecule by heating to elevated temperatures in the presence of an inert protective gas. In this reaction the carboxyl groups may change places within the same molecule as well as between several molecules. Industrially valuable di- and polycarboxylic acids, such as terephthalic acid and trimesic acid, are obtained as reaction products. In addition, in some cases, especially when alkali metal salts of monocarboxylic acids are used as starting materials, the ring systems free from carboxylic groups are formed as side products.

Process for the carboxylation of metallic salts of aromatic mono-, di- or polycarboxylic acids are described in U.S. Pats. Nos. 2,823,229, 3,014,067 and 3,043,846. Such processes comprise heating a given salt or mixture of salts to a temperature about 300° centigrade and below the temperature at which said salts and the reaction products substantially decompose in an inert atmosphere and in the presence of an acid binding agent, a desiccant, and a catalyst such as a metal halide. The present invention is an improvement on such processes and provides a surprising increase in yield as compared to the processes of the prior art. The present invention is a particularly useful improvement in a process for making terephthalic acid from a metallic salt of benzoic acid.

The present invention is a process for the carboxylation of aromatic carboxylic acids which comprises preparing an alkali metal aromatic carboxylate from an aromatic carboxylic acid having the same ring structure as the aromatic carboxylic acid to be produced, heating in an inert atmosphere under substantially anhydrous conditions said carboxylate to a temperature of from about 300° centigrade to a temperature below that temperature at which said carboxylate and the desired reaction products substantially decompose and in the presence of an acid binding agent and a basic metal carbonate catalyst selected from group which consists of basic cupric carbonate and basic chromium carbonate and acidifying the resultant salts whereby the aromatic carboxylic acid produced contains at least one more carboxyl group than the aromatic carboxylic acid to be carboxylated.

As starting materials for the process according to the invention, salts of aromatic mono-, di-, or polycarboxylic acids may be used. Such acids are, for example, benzoic acid, $\alpha$- and $\beta$-naphthoic acid, diphenyl monocarboxylic acids as well as phthalic acid, isophthalic acid, terephthalic acid, naphthalic acid and other naphthalene dicarboxylic acids or diphenic acid and other diphenyl dicarboxylic acids. Also mono- or dicarboxylic acids in which the carboxylic groups are attached to another aromatic ring system, for example to anthracene, terphenyl, diphenyl methane or benzophenone radicals, are suitable for use as starting materials for the process according to the invention, as well as tri- and polycarboxylic acids which are derived from aromatic ring systems. Also mixtures of such acids which are formed, for example, by oxidation or mixtures of alkyl aromatic compounds or coal, may be used.

Similarly, the starting materials for the process according to the invention may be salts of monobasic heterocyclic carboxylic acids, the carboxyl groups of which are attached to heterocyclic rings having an aromatic structure. Such acids are derived, for example, from pyridine, pyrazine, pyrimidine, pyridazine, $\alpha$-pyran, furan, thiophene, thiazole, quinoline, isoquinoline, indole, benzotriazole and benzimidazole.

In all of these carboxylic acids the aromatic ring or the heterocyclic ring having an aromatic structure may in addition to the carboxyl group also carry other substituents such as halogen atoms or alkyl radicals, provided that they do not decompose at temperatures below the reaction temperature. The term aromaic carboxylic acids is, therefore, intended to include both compounds having a homocyclic aromatic ring and compounds having a heterocyclic ring.

If aromatic monocarboxylic acids are used as starting materials for the performance of the process according to the invention on an industrial scale, the reaction products obtained thereby are industrially valuable dicarboxylic acids or their salts and in many cases are those dicarboxylic acids which have a symmetric structure, for example, terephthalic acid, naphthalene-2,6-dicarboxylic acid, and the like. In addition, tricarboxylic acids are formed in many cases.

The above-mentioned carboxylic acids are used as starting materials for the process of this invention in the form of their salts. Advantageously, the alkali metal salts, preferably the potassium salts or the sodium salts, are used. The lithium, rubidium and cesium salts, which may also be used for this reaction, are generally not considered for reasons of economy. It is often advantageous to use mixtures of salts of two different metals, for example, mixtures of the sodium and potassium salts, because in many cases the mechanical properties of the reaction mixture are improved thereby.

The process may also be carried out with salts of other metals, for example, with alkaline earth metal salts of the above-named carboxylic acids. In this case different reaction products are often formed, especially those having the carboxylic groups in different positions, than if the alkali metal salts are used.

In place of such salts, reaction materials which form the salts may be used. Particularly suitable materials are carboxylic acid anhydrides or also carboxylic acid esters and acid-binding metal compounds, such as alkali metal carbonates. These mixtures do not need to be provided in stoichiometric ratios. One or the other component may be used in excess.

It is advantageous to carry out the reaction according to this invention in the presence of acid-binding agents, preferably in the presence of alkali metal carbonates, alkali metal formates or alkali metal oxalates. The above-mentioned acid-binding agents do not need to be employed in stoichiometric quantities. They may be provided in quantities less than the stoichiometric amount or also in excess.

As acid-binding agents, the carbonates of alkali metals, especially potassium carbonate, are preferably used. In place of the carbonates, the salts of other weak acids may be used for example, the bicarbonates, formates or oxalates. Also the corresponding compounds of other metals are suitable, for example, the carbonates of the alkaline earth metals. These acid-binding agents likewise do not need to be present in stoichiometric amounts. They may be used in excess or in deficient quantities.

In accordance with the process of the invention, the heating is carried out under substantially anhydrous conditions. The salts or salt mixtures to be subjected to the reaction are preferably provided in as dry a condition as possible. If the salts are available in the form of their aqueous solutions they may be transformed into dry powders in accordance with known methods, preferably by spray-drying, and if necessary, subjected to a subsequent drying treatment to remove minute residual quantities of moisture. Substantially anhydrous conditions may be maintained by conducting the heating and reaction in the presence of compounds which are capable of binding or combining with the water formed by the reaction without interfering with the reaction proper. Such compounds are, for example, various metal carbides such as aluminum carbide or the carbides of the alkali metals or alkaline earth metals such as calcium carbide. Also, other compounds of such metals, for example their nitrides or borides, may be used. Free metals which readily react with water under the prevailing reaction conditions, for example aluminum, also may be used. The binding of the water formed by the reaction may also be accomplished with the aid of suitable salts, for example, with alkali metal carbonates, especially potassium carbonate, which must in such case be present in amounts considerably in excess of the quantity needed for neutralization of the newly formed carboxyl groups.

In accordance with the process of the invention, the heating is also carried out in an inert atmosphere, i.e., an atmosphere substantially free of available oxygen, and in the presence of carbon dioxide, which may be present in combined form for example in the form of a carbonate. Where gaseous carbon dioxide is not present in the process, the acid-binding agent may provide the carbon dioxide in combined form. The heating is preferably carried out in the presence of gaseous carbon dioxide under pressure. There is no upper limit for the pressure, that is, the upper pressure limit is determined only by the available apparatus, pumps, etc. The advantage of the process in accordance with the invention, however, resides in that very high pressures are not required to achieve good yields. The reaction may also be carried out at atmospheric pressure. In place of carbon dioxide gas mixtures may be used which contain inert gases such as nitrogen, methane or argon in addition to carbon dioxide. The presence of large amounts of oxygen should advantageously be avoided. It is preferable to carry out the reaction in the absence of oxygen in order to avoid decomposition of the organic material at such high temperatures. Traces of oxygen, if present, do not prevent the reaction, but reduce the yields.

The inert atmosphere may be at a pressure from about atmospheric pressure to very high pressures. The surprising improvement in yield from the process of this invention as compared to prior processes is not dependent upon pressure. Thus, using the process of this invention yields show improvement over known processes conducted at the same pressure whether the pressure is in the range of from about 1 to about 250 atmospheres or above 250 atmospheres. Even in high-efficiency processes using pressures over 400 atmospheres or as high as 1500 to 2000 atmospheres or greater, use of the process of the present invention will increase yields over known processes conducted at the same pressure. Similarly improvement in yield is noted when the process of this invention is conducted at the same temperature as known carboxylation processes and, likewise, under the same inert atmosphere.

Usually the reaction begins at temperatures between 300° centigrade and 400° centigrade. The optimum temperature will differ depending on the starting materials used. Generally the reaction temperature must be from about 300° C. to a temperature below that temperature at which the alkali metal aromatic carboxylate and the desired reaction products, i.e. more highly carboxylated aromatic carboxylic acids, substantially decompose. A preferred reaction temperature range is from about 340° centigrade to about 500° centigrade.

In a similar view, it has been found that the reaction according to the present invention is favorably influenced by the presence of catalysts. Metals such as zinc, cadmium, mercury, lead and iron, as well as compounds of these metals, such as their oxides, or their inorganic or organic acid salts, for example, their carbonates, bicarbonates, halides, sulfates, phosphates, acetates, formates, oxalates, fatty acid salts or also the salts of the above-mentioned metals formed from those acids which are employed as starting materials for the reaction according to the invention or which are formed during the reaction, for example, their benzoates, phthalates, or terephthalates, may be used as catalysts. The amount of catalyst may vary within wide limits and may range from 0 to 15% by weight, preferably from 0.5 to 5% by weight, based on the weight of reaction mixture. The catalyst may be uniformly and finely distributed throughout the reaction mixture by spray-drying or otherwise transforming an aqueous solution of the salts serving as the starting material, which has the catalyst dissolved or suspended therein, into a dry powder. The above-named catalysts may also be employed in conjunction with known carrier, for example, with kieselguhr.

The reaction according to the present invention may not only be carried out in the presence of these catalysts but also in the presence of liquid or solid additives, for example, in the presence of sand, metal powder, metal shavings, kieselguhr, activated charcoal, finely divided aluminum oxide, finely divided silicic acid, or also, inert salts such as sodium sulfate. In many cases the mechanical properties of the reaction mixture are improved by these additives. In place of the solid inert materials, inert liquids which do not decompose under the prevailing reaction conditions may also be used, such as toluene, benzene or the like.

The key to the present invention lies in the discovery that, in a process for the carboxylation of an aromatic carboxylic acid under whatever temperature, pressure, or atmospheric conditions selected and using whatever acid-binding agent, desiccant, catalyst or other additive is found to carboxylate said aromatic carboxylic acid, conducting said carboxylation in the presence of a basic metal carbonate catalyst selected from the group which consists of basic cupric carbonate and basic chromium carbonate results in a substantial increase in yield of carboxylated aromatic acid. The amount of basic metal carbonate catalysts may vary within wide limits and may range from about 0.1 to about 15 percent by weight, and preferably from about 0.5 to about 5 percent by weight, based on the weight of reaction mixture. The beneficial effect of either of these two compounds in the described carboxylation process had not previously been known.

Whereas prior teachings have treated all carbonates as being substantially equivalent in effectiveness in promoting the carboxylation reaction, the inventors here have found that a process utilizing either of these compounds alone or with other carbonates achieves a higher yield of carboxylated acid than the same process without these compounds. This remarkable effect is noted over the operable range of temperatures, pressures, and atmospheric conditions utilized in known processes. Likewise the beneficial effect of these compounds is observed in processes to carboxylate the entire range of aromatic carboxylic acids which may be further carboxylated. Particularly good results have been found in embodiments of a process for the carboxylation of benzoic acid to terephthalic acid a vital raw material in the polyester fiber industry. Additionally, the process in accordance with this invention produces other industrially valuable di- and polycarboxylic acids or their salts or derivatives, such as trimesic acid, naphthalene-2,6-dicarboxylic acid, pyridine-2,5-dicarboxylic acid, pyridine-2,4,6-tricarboxylic acid, furan-2,5-dicarboxylic acid, thiophene-2,5-dicarboxylic acid, and many others. Such acids are also useful as raw materials in the production of polyesters useful as fibers, films and resins.

In carrying out the reaction in accordance with this invention, it may be advantageous to maintain the reaction material in motion in order to avoid local overheating and decomposition caused thereby and also to prevent the reaction mixture from sintering or caking. This may, for example, be accomplished by performing the reaction in vessels provided with a stirring device, in rocking autoclaves or in rotary autoclaves. Uniform heating of the reaction material may also be effected by distributing the reaction material in thin layers with or without agitation. However, good yields are also obtained without applying these particular measures, provided care is taken that strong local overheating is avoided.

In a preferred embodiment the catalysts used herein are utilized in the form of a fluidized bed. A fluidized bed is particularly effective in maintaining uniform reaction conditions and in eliminating caking of reactants by the cotinuous agitation from the fluidizing medium.

The separation of the reaction product from the reaction material may take place in known fashion. The raw product is first dissolved in water or in dilute acids and thereafter purified by filtration or by treatment with activated charcoal or with other decoloring agents, if necessary. Subsequently the salts formed by the reaction may be transformed into the corresponding free acids by acidification with organic or inorganic acids or also by passing carbon dioxide therethrough with or without pressures. In a preferred embodiment, the aromatic carboxylic acid to be carboxylated by the process of this invention is used to acidify the salts. In this manner the alkali metal carboxylate used in this process and the desired product acid are formed in a single step enhancing the efficiency of the process. The free acids may be separated by making use of their different solubilities or volatilities, and may thereafter be isolated in relatively pure form and, if desired, transformed into their derivatives. The salt mixtures produced by the reaction may also be transformed directly into derivatives of the acids, for example, into their esters or halides, and these derivatives may then be purified by fractional distillation, if desired.

The following examples will enable persons skilled in the art to better understand and practice the invention and are not intended to be limitative.

EXAMPLES 1 THROUGH 5

These examples illustrate variations in processes of the prior art for the preparation of terephthalic acid by the carboxylation of the potassium salt of benzoic acid.

The potassium salt of benzoic acid is obtained by any suitable method. The carboxylation of potassium benzoate is carried out in a stainless steel tube (½ inch outside diameter and 12 inches long) fitted with a swagelok cap. The reactants are premixed and then are weighed into the tube. Dry Ice is added in an amount sufficient to provide an atmosphere of carbon dioxide at a pressure of 1000 pounds per square gauge at the temperature at which the reaction is conducted. The tube is sealed and immersed in a lead bath maintained at 400° centigrade. After twelve hours immersion in the lead bath, the tube is removed, cooled to room temperature, weighed, vented and reweighted to determine weight loss on venting. The reactants are washed from the tube with 25 milliliters of hot water, the resultant mixture is digested on a hot plate and filtered while hot. The filter cake is washed with 15 milliliters of hot water, dried in a vacuum oven overnight and weighed. Spot analyses are made to determine that the filter cake contains no potassium salts. The hot filtrate is acidified with 50% aqueous hydrochloric acid. After cooling, the precipitate is collected on a filter and dried to constant weight in a vacuum oven. The amount of terephthalic acid is determined by treating a carefully weighed portion of the filter cake with a solution of diazomethane in diethylether. The resulting methyl esters of the carboxylic acids are analyzed by gas chromatography. The analysis is made quantitative by incorporation of internal standards. In this set of examples the amounts of catalyst, $CdI_2$, desiccant, $AlC_3$, and acid-binding agent $K_2CO_3$ are varied. The amount of potassium benzoate, 0.0125 moles, is the same in each example.

| Example number: | Mole $CdI_2$ | Mole $AlC_3$ | Mole $K_2CO_3$ | Mole percent potassium benzoate converted to terephthalic acid |
|---|---|---|---|---|
| 1 | .0005 | | | 42 |
| 2 | .0005 | | | 40 |
| 3 | .0005 | .005 | | 43 |
| 4 | .0005 | .005 | .01 | 42 |
| 5 | | .005 | .01 | 1 |

EXAMPLES 6 THROUGH 10

These examples illustrate the use of processes of the prior art for the preparation terephthalic acid by the carboxylation of the potassium and sodium salts of benzoic acid. The method described for Examples 1 through 5 is followed except that in Examples 6, 8 and 10 equal molor quantities of sodium benzoate are used in place of potassium benzoate

| Example number | Mole $CdI_2$ | Mole $AlC_3$ | Mole $K_2CO_3$ | Mole $C_6H_5COOK$ | Mole $C_6H_5COONa$ | Mole percent of benzoate converted to terephthalic acid |
|---|---|---|---|---|---|---|
| 6 | .0005 | | .01 | | .0125 | 37 |
| 7 | .0005 | | | .0125 | | 40 |
| 8 | .0005 | | | | .0125 | [1] 18 |
| 9 | .0005 | .005 | .01 | .0125 | | 42 |
| 10 | .0005 | .005 | .01 | | .0125 | 45 |

[1] An almost equivalent amount of isophthalic acid is also produced.

EXAMPLES 11 THROUGH 15

These examples illustrate the surprising improvement in yield of terephthalic acid by the process of this invention as compared to a comparable process of the prior art. The method described for Examples 1 through 5 is followed utilizing .0005 mole of $CdI_2$ catalyst, .005 mole of $AlC_3$ desiccant and .01 mole of $K_2CO_3$ acid-binding agent along with the 0.0125 mole of potassium benzoate and, in addition, the compounds below in the amounts shown.

| Ex. No. | Basic cupric carbonate, mole | Basic chromium carbonate, mole | Ferric benzoate | Mole percent of benzoate converted to terephthalic acid | Percent increase in yield of terephthalic acid [1] |
|---|---|---|---|---|---|
| 11 | | | | 42 | |
| 12 | | .0025 | | 43 | 2.4 |
| 13 | | | .0025 | 64 | 52 |
| 14 | .0025 | | | 56 | 33 |
| 15 | .0025 | | | 59 | 41 |

[1] See the following:

$$\text{Percent increase} = \frac{\text{Mole percent of benzoate converted to terephthalic acid by this invention} - \text{Mole percent of benzoate converted to terephthalic acid by process of prior art}}{\text{Mole percent of benzoate converted to terephthalic by process of prior art}}$$

EXAMPLES 16 AND 17

These examples illustrate the surprising improvement in yield of terephthalic acid by the process of this invention as compared to a comparable process of the prior art which process utilizes different reaction conditions than described in Examples 11 through 15.

Example 16.—30 gm. potassium benzoate, 13 gm. anhydrous potassium carbonate (molar ratio 1:0.5) and 1 gm. cadmium fluoride are milled in a ball mill and the mixture is placed into an autoclave having a net volume of 0.2 liter. About 150 gm. liquid carbon dioxide are then introduced, and the contents of the autoclave are heated for 7 hours at 360° C., whereby a maximum pressure of 1540 atmospheres is developed. The reaction temperature is measured by means of a thermoelectric couple which is in the center of the reaction chamber. According to experience the wall temperature lies about 20–50° C. higher than the measured temperature.

The reaction product is dissolved in water and the terephthalic acid formed by the reaction is precipitated with hydrochloric acid. 20.7 gm. terephthalic acid are obtained which is pure. From the mother liquors 1.3% of the quantity of benzoic acid originally used are recovered. Taking into consideration the amount of recovered benzoic acid, the yield of terephthalic acid is 65.6% of theory. The calculation of the yield is made under the assumption that 1 mol benzoic acid forms 1 mole terephthalic acid.

Example 17.—The method of Example 16 is followed except that in addition to, and along with, the $K_2CO_3$, .04 mole of basic chromium carbonate are charged to the autoclave. Upon calculation a percent increase in yield of terephthalic acid is about 25 percent.

EXAMPLES 18 THROUGH 25

These examples illustrate the increased yield of a number of carboxylated aryl carboxylic acids made by the process of this invention as compared to comparable processes of the prior art.

Example 18.—A mixture of 16.1 gm. of the potassium salt of nicotinic acid (pyridine-β-carboxylic acid), 13.8 gm. potassium carbonate and 1.0 gm. cadmium fluoride is heated for 8 hours at 350° C. in an autoclave having a capacity of 0.2 liter. At the beginning of the run, 180 gm. carbon dioxide are introduced into the autoclave. At 350° C., a pressure of 1800 atmospheres is developed. After cooling and releasing the pressure from the autoclave, the reaction product, which weighs 32 gm., is dissolved in 400 cc. hot water. The solution is filtered, acidified with hydrochloric acid and then evaporated to one-half its volume. Upon cooling to 0° C., 16.1 gm. of the monopotassium salt of isocinchomeric acid (pyridine-2,5-dicarboxylic acid) crystallizes out.

Example 19.—The method of Example 18 is followed except that in addition to, and along with the $K_2CO_3$, .04 mole of basic cupric carbonate are charged to the autoclave. Upon calculation a percent increase in yield of isocinchomeric acid is about 20 percent.

Example 20.—A mixture of 52.5 gm. of the potassium salt of β-naphthoic acid, 34.5 gm. potassium carbonate and 217 gm. cadmium fluoride is heated for 6 hours at 420–430° C. in an autoclave having a capacity of 0.6 liter. Prior to heating, 480 gm. carbon dioxide are introduced into the autoclave, which produces a pressure of 1350 atmospheres at the reaction temperature. After cooling and releasing the pressure from the autoclave, the reaction product is dissolved in water and the solution is filtered. The filtrate is acidified with concentrated hydrochloric acid. The crystals which separate out are filtered off while the solution is still hot and are repeatedly washed with hot alcohol and then dried at 140° C. The yield of naphthalene-2,6-dicarboxylic acid is 26.5 gm. From the wash alcohol 8.5 gm. β-naphthoic acid are recovered.

Example 21.—The method of Example 20 is followed except that in addition to, and along with, the $K_2CO_3$, .1 mole of basic chromium carbonate are charged to the autoclave. Upon calculation a percent increase in yield of naphthalene-2,6-dicarboxylic acid is about 20 percent.

Example 22.—A mixture of 22.0 gm. of the potassium salt of thiophene-α-carboxylic acid, 27.6 gm. potassium carbonate and 2.0 gm. cadmium fluoride is heated in an autoclave for 3½ hours at 340°C. Before heating the air is displaced with carbon dioxide and thereafter sufficient carbon dioxide is introduced into the autoclave to produce an internal pressure of 800 atmospheres at the reaction temperature. The reaction product, which weighs 54.2 gm. is dissolved in 600 cc. hot water. The solution is filtered, and the filtrate is acidified with hydrochloric acid. The thiophene-2,5-dicarboxylic acid is precipitated thereby and is filtered off, washed with water and dried. The yield is 17.0 gm. By extraction with ether, 2.2 gm. of a mixture of thiophene-monocarboxylic and dicarboxylic acids having an acid number of 595 is recovered from the mother liquor and the wash water.

Example 23.—The method of Example 22 is followed except that in addition to, and along with the $K_2CO_3$, .08 mole of basic cupric carbonate are charged to the autoclave. Upon calculation a percent increase in yield of thiophene-2,5-dicarboxylic acid is about 20 percent.

Example 24.—A mixture of 32.2 gm. of the potassium salt of isonicotinic acid, 27.6 gm. potassium carbonate and 3.0 gm. cadmium fluoride is heated for 16 hours at 390° C. in an autoclave having a capacity of 600 cc. Prior to heating, the air in the autoclave is displaced with carbon dioxide, and then sufficient carbon dioxide is introduced under pressure to produce an internal pressure of 1500 atmospheres at the reaction temperature. The reaction product, which weighs 64.5 gm. is dissolved in hot water. The solution is filtered, and the clear filtrate is acidified with a quantity of hydrochloric acid equivalent to the calculated amount of potassium present. Upon cooling, 26.2 gm. of the monopotassium salt of trimestinic acid (pyridine-2,4,6-tricarboxylic acid) is crystallized out. By extraction of the mother liquor, 2.76 gm. additional pyridine-tricarboxylic acid are obtained.

Example 25.—The method of Example 24 is followed except that in addition to, and along with, the $K_2CO_3$, .08 mole of basic chromium carbonate are charged to the autoclave. Upon calculation, a percent increase in yield of pyridine-2,4,6-tricarboxylic acid is about 20 percent.

We claim:

1. A process for the carboxylation of aromatic carboxylic acids comprising preparing an alkali metal aromatic carboxylate from an aromatic carboxylic acid having the same ring structure as the aromatic carboxylic acid to be produced, heating in an inert atmosphere under substantially anhydrous conditions said carboxylate to a temperature of from about 300° centigrade to a temperature below that temperature at which said carboxylate and the desired reaction products substantially decompose and in the presence only a catalyst selected from the group consisting of the metals zinc, cadmium, mercury, lead and iron, of an acid-binding agent and a basic metal carbonate catalyst selected from group which consists of basic cupric carbonate and basic chromium carbonate and acidifying the resultant salts whereby the aromatic carboxylic acid produced contains at leas one more carboxyl group than the aromatic carboxylic acid to be carboxylated said catalyst being present as the metals, oxides of the metals or as inorganic or organic acid salts of the metals.

2. The process of claim 1 wherein the alkali metal aromatic carboxylate is prepared from an aromatic monocarboxylic acid.

3. The process of claim 1 wherein the alkali metal aromatic carboxylate is prepared from benzoic acid.

4. The process of claim 1 wherein the alkali metal aromatic carboxylate is potassium benzoate.

5. The process of claim 1 wherein the alkali metal aromatic carboxylate is sodium benzoate.

6. The process of claim 1 wherein the alkali metal aromatic carboxylate is prepared from an aromatic dicarboxylic acid.

7. The process of claim 1 wherein the alkali metal aromatic carboxylate is prepared from an aromatic tricarboxylic acid.

8. The process of claim 1 wherein the basic metal carbonate catalyst is basic cupric carbonate.

9. The process of claim 1 wherein the basic metal carbonate catalyst is basic chromium carbonate.

10. A process for the carboxylation of benzoic acid comprising preparing potassium benzoate from benzoic acid, heating, in a carbon dioxide atmosphere, potassium benzoate to a temperature of from about 340° centigrade to about 500° centigrade in the presence of $CdI_2$ an acid-binding agent, a desiccant and basic cupric carbonate, and acidifying the resultant potassium phthalate salts, whereby phthalic acids are formed from benzoic acid.

11. The process of claim 10 wherein the potassium benzoate is heated in the presence of basic chromium carbonate.

12. The process of claim 10 wherein sodium benzoate rather than potassium benzoate is prepared from benzoic acid.

References Cited
UNITED STATES PATENTS

| | | | |
|---|---|---|---|
| 3,096,366 | 7/1963 | Smith et al. | 260—515 |
| 3,546,282 | 12/1970 | Murase | 260—515 |

JAMES A. PATTEN, Primary Examiner

U.S. Cl. X.R.

260—250 A, 251 R, 287 R, 295 R, 302 R, 308 R, 309.2, 326.13 R, 332.2 C, 345.7, 347.3, 517